United States Patent Office 3,440,319
Patented Apr. 22, 1969

3,440,319
GERMICIDAL COMPOSITION
James H. Wilson, Demarest, N.J., assignor to Lever Brothers Company, New York, N.Y., a corporation of Maine
No Drawing. Filed Dec. 29, 1964, Ser. No. 422,001
Int. Cl. A61k 27/00
U.S. Cl. 424—230            16 Claims

ABSTRACT OF THE DISCLOSURE

Aqueous germicidal compositions having improved stability against discoloration by light which comprise an aqueous medium containing a halogenated organic germicide and a stabilizer therefor which is either hydrogen peroxide or hydrogen peroxide plus a water-soluble inorganic sulfite.

---

The present invention relates to aqueous germicidal compositions having improved stability against discoloration by natural and artificial light.

Aqueous germicidal compositions are unstable when exposed to sunlight or actinic light and even artificial lighting for prolonged periods in that they become discolored or darkened by photo-decomposition. Although aqueous germicidal compositions can have improved stability against discoloration by light by the incorporation therein of an inorganic sulphite, resilient containers filled with such compositions, even in the absence of light, are subject to significant collapse or panelling of the resilient container walls. It is thought that this collapse or panelling of such filled resilient containers is due to the removal of oxygen in the headspace of the resilient container due to the presence of an inorganic sulphite reducing agent in the aqueous germicidal composition. Furthermore, the use of an inorganic sulphite imparts an undesirable sour odor to aqueous germicidal compositions.

Accordingly, it is the object of the present invention to provide aqueous germicidal compositions having improved stability against discoloration by natural and artificial light and further to provide such aqueous germicidal compositions which are free of any sour odor and can be packaged in resilient containers without causing undue collapse or panelling of the resilient container walls.

The aqueous germicidal compositions satisfying the object of the invention comprise an aqueous medium containing a halogenated organic germicide and either hydrogen peroxide as a discoloration inhibitor or stabilizer therefor or preferably both hydrogen peroxde and a water soluble inorganic sulphite as a composite discoloration inhibitor or stabilizer therefor.

The dispersing or dissolution medium for the germicidal compositions is an aqueous medium which can be water or water admixed with a lower aliphatic monohydric or polyhydric alcohol, such as methanol, ethanol, propanol or glycol.

The aqueous medium contains a halogenated organic germicide in a germicidally effective amount, normally from about 0.1% to about 1% by weight and preferably in an amount of about 0.5% by weight of the total composition. The halogenated organic germicides are well known conventional materials, representative examples of which include the normal and alkali metal salt forms of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4'5-tetrachlorosalicylanilide, trichlorocarbanilide, and hexachlorophene or 2,2'-dihydroxy-3,5,6,3',5',6'-hexachlorodiphenyl methane. The preferred halogenated organic germicides are the normal and equivalent alkali metal salt forms of 3,4',5-tribromosalicylanilide and 4',5-dibromosalicylanilide as well as mixtures thereof containing at least about 50% by weight of 3,4',5-tribromosalicylanilide.

The aqueous germicidal compositions contain hydrogen peroxide ($H_2O_2$) as a discoloration inhibitor or stabilizer. The hydrogen peroxide is utilized in an amount such that the weight ratio of hydrogen peroxide to germicide is from about 1:1 to about 1:3, and preferably is about 1:2. Greater relative amounts of hydrogen peroxide to germicide are generally not employed because they would be unnecessary and may tend to alter the odor of any perfumes which may be present in the compositions. Lesser relative amounts of hydrogen peroxide to germicide are generally not employed because they do not impart sufficient stability to the germicidal compositions against discoloration by light.

In the preferred embodiment of the invention which contains hydrogen peroxide and a water soluble inorganic sulphite as a composite discoloration inhibitor or stabilizer, the weight ratio of hydrogen peroxide plus inorganic sulphite to germicide is generally from about 1:1 to about 1:6, and preferably is from about 1:2 to about 1:4. The weight ratio of hydrogen peroxide to inorganic sulphite in order to prevent the inorganic sulphite from causing undue collapse or panelling of resilient containers containing the germicidal compositions is from about 1:1 to about 8:1, and preferably about 2:1. Typical water soluble inorganic sulphites which can be used in the composite discoloration inhibitors include alkali metal, such as lithium, sodium and potassium, and ammonium and magnesium, sulphites ($M_2SO_3$ and $MSO_3$), metabisulphites ($M_2S_2O_5$) and hydrosulphites ($M_2S_2O_4$). The preferred water soluble inorganic sulphites are sodium metabisulphite ($Na_2S_2O_5$) and sodium hydrosulphite ($NaS_2O_4$).

The compositions of the invention are prepared by dissolving the germicide in the aqueous medium and then adding hydrogen peroxide thereto. In the preparation of the preferred embodiment of the invention containing a water soluble inorganic sulphite, the inorganic sulphite is added to the aqueous medium containing the germicide and then the hydrogen peroxide is separately added thereto.

The aqueous germicidal compositions of the invention generally contain other compatible adjuvants so as to form aqueous germicidal detergent compositions. Typical of such adjuvants are anionic, cationic or nonionic nonsoap detergents, water-soluble fatty acid soaps, inorganic detergents, inorganic builder salts, sequestering agents, hydrotropes, opacifiers, perfumes, soil suspending agents, optical brighteners, colorants, and abrasive particles. Such materials for the formulation of aqueous detergent compositions are conventional materials and have been fully described in the technical and patent literature, for example in "Soaps and Detergents" by Thomssen and McCutcheon and "Encyclopedia of Chemical Technology" by Kirk and Othmer.

The aqueous germicidal compositions of the invention are exemplified by the examples set forth below which are given by way of illustrating the invention and not by way of limitation thereof.

Example I

The following aqueous germicidal comopsitions were prepared and tested for stability against discoloration by sunlight:

| Components | Percent by Weight | |
|---|---|---|
| | A | B |
| Ammonium dodecylbenzene sulfonate (from phenyl polypropylene) | 16.95 | 16.15 |
| Ammonium salt of sulfated condensate of dodecylphenol with ethylene oxide, molar ratio average of 1 to 6 | 11.61 | 11.61 |
| Lauric diethanolamide | 6.00 | 6.00 |
| Ammonium xylene sulfonate | 9.00 | 9.00 |
| Opacifier (a polystyrene latex) | 0.80 | 0.10 |
| Germicide (equal parts of 3,4′,5-tribromosalicylanilide and 4′,5-dibromosalicylanilide) | 0.50 | 0.50 |
| Perfume | 0.20 | 0.20 |
| Red Colorant | 0.00022 | 0.00022 |
| Hydrogen peroxide (10% of 3% solution) | 0.30 | |
| Water to | 100 | 100 |

Samples of the above products were placed in 8-ounce clear transparent glass bottles with narrow necks and threaded plastic caps. The bottles were placed on a west window sill for 56–59 days. The above Formulation B which did not contain any hydrogen peroxide discoloration inhibitor had darkened to a muddy brown color, whereas the above Formulation A containing hydrogen peroxide had no significant change in color from its original white and opaque color.

Example II

Water soluble inorganic sulphites, hydrogen peroxide and mixtures thereof were tested in Formulation B of Example I as discoloration inhibitors when these products were exposed to sunlight for a prolonged period. The products were also stored in the dark in resilient plastic bottles to determine any collapse thereof. The odor of the products when made was also observed. These formulations and the results of these tests were as follows:

| Discoloration Inhibitor | Amount of Inhibitor | | | | | | |
|---|---|---|---|---|---|---|---|
| | A | B | C | D | E | F | G |
| $Na_2S_2O_4$ | | | | 0.03 | | | |
| $Na_2S_2O_5$ | | 0.10 | | | 0.05 | 0.05 | 0.05 |
| $H_2O_2$ | | | 0.20 | 0.05 | 0.20 | 0.10 | 0.05 |
| Odor when made | Good | Fair | Good | Good | Good | Good | Good |
| Color after 44 days | Muddy Brown | OK | OK | OK | OK | OK | OK |
| Collapse | OK | Poor | OK | OK | OK | OK | OK |

It will be noted from the comparative data in the table above that the aqueous germicidal Formulations C through G of the invention had satisfactory ratings for odor, color and collapse, whereas Formulation A which was free of a discoloration inhibitor had discolored badly and Formulation B containing only a water soluble inorganic sulphite as the discoloration inhibitor had unsatisfactory ratings for odor and collapse.

Example III

Liquid germicidal detergent products having the composition of Formulation B of Example I, except that the germicide content was 0.4%, were packed in 12-fluid ounce resilient plastic cylindrical containers. They were stored for 30 days in packing cases and therefore not exposed to light. They were examined after the 30 days for collapse. By "collapse" is meant a distortion of the container to a shape that is other than circular on a cross-section at the point of distortion. At times the distortion produces a flat section and the collapse is sometimes referred to as "panelling."

Examination was made by measuring the smallest diameter of a partially collapsed container at the point of collapse, the diameter originally being $25/32$ inches. Several containers were examined and given a grade number ranging from 0 for no collapse to 5 for a collapse to $1^{27}/_{32}$ inch size. A weighted average provided the comparative grade number.

The results of such tests were as follows:

| Formula | Discoloration Inhibitor | Grade No. |
|---|---|---|
| A | 0.10% $Na_2S_2O_4$ | 5.0 |
| B | 0.05% $Na_2S_2O_4$ | 2.66 |
| C | 0.025% $Na_2S_2O_4$ | 0.91 |
| D | 0.05% $Na_2S_2O_4$ plus 0.20% $H_2O_2$ | 0.38 |
| E | 0.05% $Na_2S_2O_4$ plus 0.10% $H_2O_2$ | 0.46 |
| F | 0.05% $Na_2S_2O_4$ plus 0.05% $H_2O_2$ | 0.50 |
| G | 0.025% $Na_2S_2O_4$ plus 0.20% $H_2O_2$ | 0.58 |
| H | 0.025% $Na_2S_2O_4$ plus 0.10% $H_2O_2$ | 0.54 |
| I | 0.025% $Na_2S_2O_4$ plus 0.05% $H_2O_2$ | 0.50 |
| J | None | 0.58 |
| K | 0.20% $H_2O_2$ | 0.29 |

The comparative data in the above table for 12-fluid ounce resilient containers establish that Formulations D through I and K of the invention had greatly improved collapse ratings of 0.29 to 0.58 compared with Formulations A through C which contained only a water soluble inorganic sulphite as the discoloration inhibitor and had poorer collapse ratings of 0.91 to 5.0.

An experiment to determine the collapse of a 32-fluid ounce resilient plastic cylindrical container holding the same detergent composition as above was made, using the discoloration inhibitors listed below. For the 32-fluid ounce size container, a grade of 0 indicates no collapse from the original $2^{31}/_{32}$ inch diameter. Progressive amounts of collapse were given an increasingly higher grade number to a maximum of 5 for a diameter of $2^{11}/_{16}$ inches at the point of maximum collapse. The figures shown below are weighted averages. The flexible containers were stored for 61 days in packing cases and therefore not exposed to light. They were examined after this period of 61 days for collapse.

| Formula | Discoloration Inhibitor | Grade No. |
|---|---|---|
| L | 0.05% $Na_2S_2O_5$ | 4.8 |
| M | 0.05% $Na_2S_2O_4$ | 4.7 |
| N | 0.20% $H_2O_2$ | 1.4 |
| O | 0.05% $Na_2S_2O_4$ plus 0.05% $H_2O_2$ | 2.1 |
| P | 0.03% $Na_2S_2O_4$ plus 0.05% $H_2O_2$ | 3.3 |
| Q | 0.05% $Na_2S_2O_5$ plus 0.20% $H_2O_2$ | 1.7 |
| R | 0.05% $Na_2S_2O_5$ plus 0.10% $H_2O_2$ | 2.3 |
| S | 0.05% $Na_2S_2O_5$ plus 0.05% $H_2O_2$ | 3.3 |

The comparative data in the table above indicate that Formulations N through S of the invention had superior collapse grades of 1.4 to 3.3 compared with poorer collapse grades of 4.7 and 4.8 for Formulations L and M containing only a water soluble inorganic sulphite as a discoloration inhibitor.

Example IV

The following compositions were prepared containing 0.16% by weight of brominated salicylanilide germicide having bromine in the positions indicated below, 0.062% by weight of KOH and 0.10% by weight of $H_2O_2$ in an aqueous solvent medium composed of 20% n-propanol and 80% water. The compositions were placed in capped 4-ounce glass jars and the jars placed on a shelf at a clear, colorless west window. Observations of color after two days of sunlight exposure were made, the results being as follows:

| Formula | Active Ingredients | Color |
|---|---|---|
| A | 0.16% 3,5-dibromo | Amber. |
| B | 0.16% 3,5-dibromo plus 0.1% $H_2O_2$ | Light yellow. |
| C | 0.16% 4'-monobromo | Do. |
| D | 0.16% 4'-monobromo plus 0.1% $H_2O_2$ | White. |
| E | 0.16% 5-monobromo | Light yellow. |
| F | 0.16% 5-monobromo plus 0.1% $H_2O_2$ | White. |
| G | 0.16% 3,4',5-tribromo | Amber. |
| H | 0.16% 3,4',5-tribromo plus 0.1% $H_2O_2$ | Light yellow. |

It will be noted from the above comparative data that those aqueous germicidal compositions free of hydrogen peroxide discoloration inhibitor (Formulations A, C, E and G) were darkened in color upon exposure to sunlight as contrasted with the less discolored compositions containing the hydrogen peroxide discoloration inhibitor (Formulations B, D, F and H respectively).

Example V

The compositions set forth below were placed in 8-ounce clear transparent glass bottles with narrow necks and threaded plastic caps. The bottles were placed on the roof for 4 days and their color then observed after such severe exposure to sunlight.

| Components | Percent by weight ||||||
|---|---|---|---|---|---|---|
|  | A | B | C | D | E | F |
| Ammonium dodecylbenzene sulfonate (from phenyl polypropylene) | 10.0 | 10.0 |  |  |  |  |
| Specially denatured ethyl alcohol | 12.0 | 12.0 | 12.0 | 12.0 | 12.0 | 12.0 |
| Germicide (containing a minimum of 90% 3,4',5-tribromosalicylanilide) | 0.5 | 0.5 | 0.5 | 0.5 | 0.5 | 0.5 |
| Ammonium hydroxide (28% solution) | 0.5 | 0.5 | 0.5 | 0.5 |  |  |
| Triethanolamine salt of sulfated coconut oil alcohols |  |  | 10.0 | 10.0 | 10.0 | 10.0 |
| Lauric diethanolamide |  |  |  |  | 5.0 | 5.0 |
| $Na_2S_2O_5$ |  | 0.1 |  | 0.1 |  | 0.1 |
| $H_2O_2$ |  | 0.2 |  | 0.2 |  | 0.2 |
| Water plus Inert Impurities | By Difference to 100% ||||||
| Color after 4 days' exposure to sunlight | (¹) | (²) | (³) | (²) | (⁴) | (²) |

¹ Dark brown.
² Light amber.
³ Dark amber.
⁴ Reddish brown.

Even under this severe sunlight exposure test, Formulations B, D and F of the invention had superior stability against discoloration in comparison with Formulations A, C and E respectively which were free of any discoloration inhibitor.

Example VI

The color and odor of the following product were satisfactory after 13 days' aging under the condition described in Example V.

| Components: | Parts by weight |
|---|---|
| Ammonium alkylbenzene sulfonate [a] | 16.95 |
| Ammonium salt of a sulfated condensate of an average of 3.5 moles of ethylene oxide per mole of fatty alcohol [b] | 11.61 |
| Fatti alcohol [c] | 0.50 |
| Lauric diethanolamide | 6.00 |
| Germicide (containing a minimum of 90% 3,4',5-tribromosalicylanilide) | 0.40 |
| Ammonium xylene sulfonate | 9.00 |
| $H_2O_2$ | 0.20 |
| Colorant | 0.0022 |
| Perfume | 0.15 |
| Water and miscellaneous impurities to | 100. |
|  | 100.0 |

[a] From mixed phenylalkanes of which the alkyl portion is a straight chain having an average of 11.7 carbon atoms and in which the phenyl group is randomly attached at all positions along the alkyl chain. The average molecular weight of the phenylalkane is 242.
[b] From Alfol 1412, a mixture of primary aliphatic alcohols consisting mainly of $C_{14}$ and $C_{12}$ chain lengths in the approximate ratio of 2:1 respectively.
[c] Alfol 1412.

From the comparative data given above in Examples 1 through 6 it is apparent that aqueous germicidal compositions containing a halogenated organic germicide can have improved stability against discoloration by light, provided there is incorporated therein hydrogen peroxide as a discoloration inhibitor or stabilizer in the amounts set forth hereinabove. The data also establish that aqueous germicidal compositions containing a halogenated organic germicide can have improved stability against discoloration by light and will not cause significant collapse of resilient containers containing the compositions even though the compositions contain a water soluble inorganic sulphite, provided the compositions also contain hydrogen peroxide, the amounts of water soluble inorganic sulphite and hydrogen peroxide being as set forth hereinabove. Furthermore, the compositions of the invention have a satisfactory odor even when they contain an inorganic sulphite.

What is claimed is:

1. An aqueous germicidal composition having improved stability against discoloration by light which comprises an aqueous medium containing from about 0.1% to about 1% by weight of a halogenated organic germicide selected from the group consisting of the normal and alkali metal salts of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4',5-tetrachlorosalicylanilide, trichlorocarbanilide and hexachlorophene, and hydrogen peroxide as a stabilizer therefore, the relative amount by weight of hydrogen peroxide to germicide being from about 1:1 to about 1:3.

2. An aqueous germicidal composition having improved stability against discoloration by light which comprises an aqueous medium containing about 0.5% by weight of a halogenated organic germicide selected from the group consisting of the normal and alkali metal salts of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4',5 - tetrachlorosalilylanilide, trichlorocarbanilide, and hexachlorophene, and hydrogen peroxide as a stabilizer therefor, the relative amount by weight of hydrogen peroxide to germicide being about 1:2.

3. An aqueous germicidal composition having improved stability against discoloration by light which comprises an aqueous medium containing from about 0.1% to about 1% by weight of 3,4',5-tribromosalicylanilide germicide and hydrogen peroxide as a stabilizer therefore, the relative amount by weight of hydrogen peroxide to germicide being from about 1:1 to about 1:3.

4. An aqueous germicidal composition having improved stability against discoloration by light which comprises an aqueous medium containing about 0.5% by weight of 3,4',5-tribromosalicylanilide germicide and hydrogen peroxide as a stabilizer therefore, the relative amount by weight of hydrogen peroxide to germicide being about 1:2.

5. An aqueous germicidal composition having improved stability against discoloration by light which comprises an aqueous medium containing from about 0.1% to about 1% by weight of 4',5-dibromosalicylanilide germicide and hydrogen peroxide as a stabilizer therefor, the relative amount by weight of hydrogen peroxide to germicide being from about 1:1 to about 1:3.

6. An aqueous germicidal composition having improved stability against discoloration by light which comprises an aqueous medium containing about 0.5% by weight of 4',5-dibromosalicylanilide germicide and hydrogen peroxide as a stabilizer therefor, the relative amount by weight of hydrogen peroxide to germicide being about 1:2.

7. An aqueous germicidal composition having improved stability against discoloration by light which comprises an aqueous medium containing from about 0.1% to about 1% by weight total of a mixture of 3,4',5-tribromosalicylanilide and 4',5-dibromosalicylanilide germicides, and hydrogen peroxide as a stabilizer therefor, the relative amount by weight of hydrogen peroxide to total germicide being from about 1:1 to about 1:3, the 3,4',5-tribromosalicylanilide germicide constituting at least about 50% by weight of the germicidal mixture.

8. An aqueous germicidal composition having improved stability against discoloration by light which comprises an aqueous medium containing about 0.5% by weight total of a mixture of 3,4',5-tribromosalicylanilide and 4',5-dibromosalicylanilide germicides, and hydrogen peroxide as a stabilizer therefor, the relative amount by weight of hydrogen peroxide to total germicide being about 1:2, the 3,4',5-tribromosalicylanilide germicide constituting at least about 50% by weight of the germicidal mixture.

9. An aqueous germicidal composition having improved stability against discoloration by light which comprises an aqueous medium containing from about 0.1% to about 1% by weight of a halogenated organic germicide selected from the group consisting of the normal and alkali metal salts of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4',5 - tetrachlorosalicylanilide, trichlorocarbanilide, and hexachlorophene, and hydrogen peroxide plus a water soluble inorganic sulphite selected from the group consisting of alkali metal, ammonium and magnesium sulphites, metabisulphites, and hydrosulphites as a composite stabilizer therefor, the relative amount by weight of hydrogen peroxide plus inorganic sulphite to germicide being from about 1:1 to about 1:6, the relative amount by weight of hydrogen peroxide to inorganic sulphite being from about 1:1 to about 8:1.

10. An aqueous germicidal composition having improved stability against discoloration by light which comprises an aqueous medium containing about 0.5% by weight of a halogenated organic germicide selected from the group consisting of the normal and alkali metal salts of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4',5-tetrachlorosalicylanilide, trichlorocarbanilide, and hexachlorophene, and hydrogen peroxide plus a water soluble inorganic sulphite selected from the group consisting of alkali metal, ammonium and magnesium sulphites, metabisulphites and hydrosulphites as a composite stabilizer therefor, the relative amount by weight of hydrogen peroxide plus inorganic sulphite to germicide being from about 1:2 to about 1:4, the relative amount by weight of hydrogen peroxide to inorganic sulphite being about 2:1.

11. An aqueous germicidal composition having improved stability against discoloration by light which comprises an aqueous medium containing from about 0.1% to about 1% by weight of 3,4',5-tribromosalicylanilide germicide and hydrogen peroxide plus a water soluble inorganic sulphite selected from the group consisting of alkali metal, ammonium and magnesium sulphites, metabisulphites and hydrosulphites as a composite stabilizer therefor, the relative amount by weight of hydrogen peroxide plus inorganic sulphite to germicide being from about 1:1 to about 1:6, the relative amount by weight of hydrogen peroxide to inorganic sulphite being from about 1:1 to about 8:1.

12. An aqueous germicidal composition having improved stability against discoloration by light which comprises an aqueous medium containing about 0.5% by weight of 3,4',5-tribromosalicylanilide germicide and hydrogen peroxide plus a water soluble inorganic sulphite selected from the group consisting of alkali metal, ammonium and magnesium sulphites, metabisulphites and hydrosulphites as a composite stabilizer therefor, the relative amount by weight of hydrogen peroxide plus inorganic sulphite to germicide being from about 1:2 to about 1:4, and the relative amount by weight of hydrogen peroxide to inorganic sulphite being about 2:1.

13. An aqueous germicidal composition having improved stability against discoloration by light which comprises an aqueous medium containing from about 0.1% to about 1% by weight of 4',5-dibromosalicylanilide germicide and hydrogen peroxide plus a water soluble inorganic sulphite selected from the group consisting of alkali metal, ammonium and magnesium sulphites, metabisulphites and hydrosulphites as a composite stabilizer therefor, the relative amount by weight of hydrogen peroxide plus inorganic sulphite to germicide being from about 1:1 to about 1:6, and the relative amount by weight of hydrogen peroxide to inorganic sulphite being from about 1:1 to about 8:1.

14. An aqueous germicidal composition having improved stability against discoloration by light which comprises an aqueous medium containing about 0.5% by weight of 4',5-dibromosalicylanilide germicide and hydrogen peroxide plus a water soluble inorganic sulphite selected from the group consisting of alkali metal, ammonium and magnesium sulphites, metabisulphites and hydrosulphites as a composite stabilizer therefor, the relative amount by weight of hydrogen peroxide plus inorganic sulphite to germicide being from about 1:2 to about 1:4, the relative amount by weight of hydrogen peroxide to inorganic sulphite being about 2:1.

15. An aqueous germicidal composition having improved stability against discoloration by light which comprises an aqueous medium containing from about 0.1% to about 1% by weight total of a mixture of 3,4',5-tribromosalicylanilide and 4',5-dibromosalicylanilide germicides and hydrogen peroxide plus a water soluble inorganic sulphite selected from the group consisting of alkali metal, ammonium and magnesium sulphites, metabisulphites and hydrosulphites as a composite stabilizer therefor, the relative amount by weight of hydrogen peroxide plus inorganic sulphite to total germicide being from about 1:1 to about 1:6, the relative amount by weight of hydrogen peroxide to inorganic sulphite being from about 1:1 to about 8:1, and the 3,4',5-tribromosalicylanilide germicide constituting at least about 50% by weight of the germicidal mixture.

16. An aqueous germicidal composition having improved stability against discoloration by light which comprises an aqueous medium containing about 0.5% by weight total of a mixture of 3,4',5-tribromosalicylanilide and 4',5-dibromosalicylanilide germicides and hydrogen peroxide plus a water soluble inorganic sulphite selected from the group consisting of alkali metal, ammonium and magnesium sulphites, metabisulphites and hydrosulphites as a composite stabilizer therefor, the relative amount by weight of hydrogen peroxide plus inorganic sulphite to total germicide being from about 1:2 to about 1:4, the relative amount by weight of hydrogen peroxide to inorganic sulphite being about 2:1, and the 3',4',5-tribromosalicylanilide germicide constituting at least about 50% by weight of the germicidal mixture.

References Cited

UNITED STATES PATENTS

| | | |
|---|---|---|
| 2,665,285 | 1/1954 | Johnson. |
| 2,879,284 | 3/1959 | Divine. |
| 3,057,920 | 10/1962 | Schramm _____ 167—31 |
| 3,152,039 | 10/1964 | Mattson _____ 167—31 |
| 3,244,585 | 4/1966 | Stecker. |

ALBERT T. MEYERS, *Primary Examiner.*

J. GOLDBERG, *Assistant Examiner.*

U.S. Cl. X.R.

252—95; 424—130, 164, 322, 347